Sept. 5, 1939.	F. H. RICHTERKESSING	2,171,865
SELECTIVE CONTROL SYSTEM
Original Filed July 29, 1932

Inventor
FRANK H RICHTERKESSING
By John L. Milton.
Attorney

Patented Sept. 5, 1939

2,171,865

UNITED STATES PATENT OFFICE 2,171,865

SELECTIVE CONTROL SYSTEM

Frank H. Richterkessing, Louisville, Ky., assignor to Cheatham Electric Switching Device Co., Incorporated, a corporation of Kentucky, and Nachod & United States Signal Co., Incorporated, Louisville, Ky., a corporation of Kentucky Original application July 29, 1932, Serial No. 626,241. Divided and this application August 10, 1937, Serial No. 158,361

7 Claims. (Cl. 246—227)

The present application is a division of my parent application Ser. No. 626,241, filed on July 29, 1932 and entitled "Speed selective control system", which application issued on September 7, 1937 as Letters Patent No. 2,092,021.

The invention in the present application relates to improvements in a selective control system, whereby the operator of a vehicle may selectively determine the operation of a mechanism according to the speed at which he operates the vehicle in passing an actuating device.

Other embodiments of this principal of operation, are illustrated in the parent application referred to at the outset, and my co-pending divisional application S. N. 158,362, filed on August 10, 1937 and entitled "Vehicle-controlled selective system".

Each of the foregoing applications embrace certain fundamental principles of circuit design that may be employed to provide an efficient and low cost apparatus for accomplishing selection according to the speed at which a vehicle is operating.

Heretofore, the common method of providing selective operation, depended upon the use of "power on" or "power off" the operating motors of a vehicle. While this method of selection is fairly satisfactory, for vehicles deriving propulsion current from an auxiliary conductor, its use is necessarily limited to such vehicular operation. Obviously, this method of selection is not applicable to controls operated by vehicles propelled by self-contained power systems.

Changes in operating conditions have also rendered the well known "power on" and "power off" system of selection impractical. For instance, the increased current consumption of the auxiliaries of electric railway vehicles, have decreased the margin between auxiliary currents and motor operating currents. In fact, in some instances the auxiliary currents have practically equaled the motor currents. Also, the use of the "power on" and "power off" principle of selection on steep grades has proven to be impractical, as it is difficult for the operator of a vehicle to shut-off power to the motors of the vehicle and "coast" up-hill. Similarly, the use of motor current "down-hill" for selection encounters difficulties through the regeneration of the vehicle motors.

Accordingly, the principal object of this invention is to provide a system that will affect one operation, when a vehicle operates at a speed less than a certain predetermined amount, and which will affect a different operation, when the vehicle operates at a speed greater than the predetermined amount.

The present application provides an additional feature, not found in my original application filed on July 29, 1932, of providing one actuating device for controlling selection, and a separate device for controlling operation according to the selection determined by the operation of the first device. Such an arrangement of circuits has found many varied applications in the control of signals, as adverted to in my parent application Serial Number 626,241.

Another object of this invention is to provide a system that will supply a definite time of current application after selection has been completed.

A still further object of this invention is to provide a system in which the speed of the vehicle is effective only while the device controlling selection is actuated.

Another object of this invention is to provide a system in which selective operation can be accomplished only when a vehicle moves in one direction, and which will always provide the same operation when a vehicle moves in the reverse direction.

These objects are attained by the apparatus illustrated in the accompanying drawing, in which—

Figure 1:
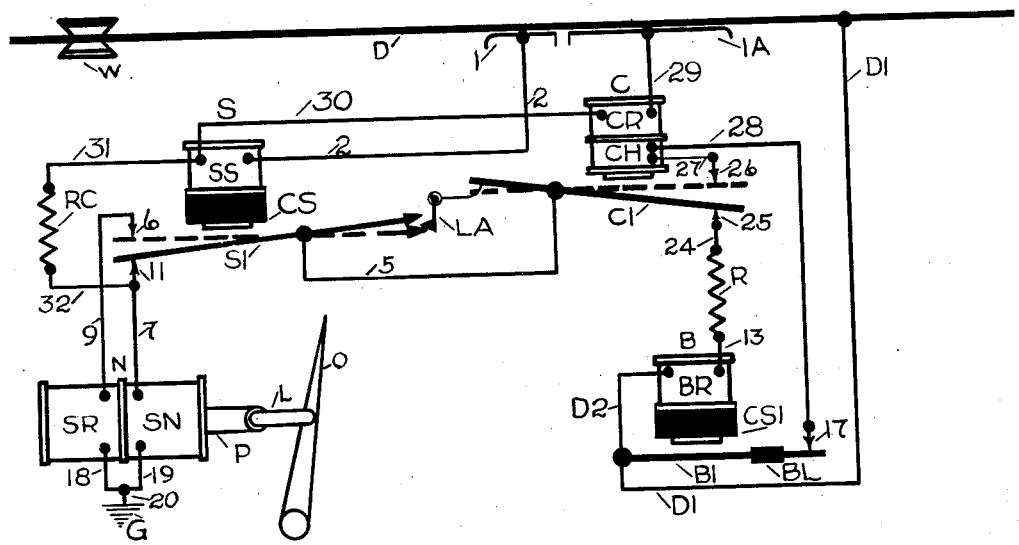
Figure 1 illustrates an embodiment of my invention as applied to the selective control of a mechanism operating a switch point.

With reference to Fig. 1, the character O designates a switch tongue, which is electro-magnetically operated by solenoids SN and SR. The reciprocating plunger P, operating within solenoids SN and SR, mechanically connects switch tongue O through link L. Although the switch tongue O is illustrated in the "normal" position, it must be understood that it may be illustrated normally in either of its operable positions. It is to be further understood that, while I have illustrated the solenoids SN and SR operating a switch tongue, such solenoids may be proportioned according to the amount of work to be performed, and employed to operate any type of mechanism.

The character D designates a current conductor or overhead trolley wire. Positioned adjacent the conductor D is represented an actuating device or trolley contactor, consisting of a pair of contact members 1 and 1A that are arranged to be engaged by a current collector W of a vehicle.

It is to be understood that, although I have illustrated the contact members as being engaged by the current collector W, such contact members may be of any construction to provide the equivalent operation as a vehicle passes a given point.

The relay C is provided with an operating coil CR and a holding coil CH, which control an armature C1 operating between contacts 25 and 26.

The relay B is provided with an operating coil BR and an armature B1 normally engaging a contact 17 located within a magnetic blowout represented by the symbol BL. The relay B is of the slow release type, and is provided with means, symbolically represented by CS1, for retarding the release of its armature B1 upon deenergization of its operating coil BR. It is well known to those familiar with the art that many methods may be employed to retard the release of an armature, such as an oil dash-pot, a copper or brass sleeve about the core of the relay, a mechanical inertia device, or any combination of the latter.

The relay S is a slow pick-up relay, and is provided with an operating coil SS and an armature S1 operating between contacts 6 and 11. The relay S is provided with means, symbolically represented by CS, for retarding the pick-up of armature S1. It is apparent that this device may be of the same character as employed on relay B, arranged for operation in the reverse order.

Resistance units R and RC may be of any of the conventional forms ordinarily employed in electrically controlled apparatus to limit the amount of current in a circuit.

With further reference to Fig. 1, it will be noted that relays C and S, in addition to their electrical functions, have a mechanical relation one to the other. When the relays C and S are in their normal conditions, the armature S1 can be moved to either of its operative positions, but when the armature C1 is in engagement with its front contact 26, the armature S1 can not be operated, since a mechanical latch, operated by armature C1, mechanically locks armature S1 against operation. This mechanical latch is symbolically represented by the characters LA, and it is believed the illustration of this device so clearly indicates its functions, that a further detailed description of its construction is unnecessary, since it will be evident to those familiar with the art how such a device can be constructed to provide the mechanical relations dealt with in the description of Fig. 3.

In Fig. 1 the circuits are arranged so that selective energization of the solenoids SN and SR is provided only when the current collector W first engages contact member 1 and then successively engages contact member 1A. The circuits are further arranged so that, when the current collector initially engages contact member 1A, only the solenoid SN is energized. In other words, the vehicle moving in one direction, can affect selective operation of the switch tongue O according to the will of the motorman, while the movement of the vehicle in the reverse direction will always operate the switch tongue O to the same position regardless of the will of the motor man.

The operating coil BR of relay B is normally energized, and normally retains its armature B1 in engagement with front contact 17. The circuit for the energization of operating coil BR being completed from the current conductor D, through wire D1, wire D2, operating coil BR, wire 13, resistance unit R, wire 24, back contact 25, armature C1, wire 5, armature S1, back contact 11, wire 7, solenoid SN, wire 19, wire 20 to ground G. The current flowing in the latter circuit is sufficient to energize operating coil BR, but is not sufficient to energize solenoid SN. Assuming that the vehicle is moving in the direction so that contact member 1 is initially engaged, it will be apparent that, while the contact member 1 is so engaged, the operating coil SS of relay S is energized. The circuit for energizing operating coil SS being completed from the current conductor D, through the current collector W to contact member 1, through wire 2, operating coil SS, wire 31, resistance unit RC, wire 32, wire 7, solenoid SN, wire 19, wire 20 to ground G. It must likewise be understood that the current flowing in this circuit is not sufficient to energize solenoid SN. As previously mentioned, armature S1 is provided with a device for retarding its pick-up.

It will be evident, therefore, that armature S1 will not instantly disengage its back contact 11, when the operating coil SS is energized. However, should the operating coil SS be energized for a sufficient length of time, the armature S1 will disengage back contact 11 and engage its front contact 6. It will be apparent that the length of time the operating coil SS is energized is dependent entirely upon the length of time the current collector engages the contact member 1. That is, if the vehicle is traveling at a relatively high speed, the operating coil SS is energized for a comparatively short period, while the vehicle traveling at a relatively low speed, the operating coil SS is energized for a comparatively long period.

In the event the current collector engages the contact member 1 for a comparatively long period, armature S1 disengages contact 11 and engages contact 6. As soon as the current collector disengages contact member 1, and comes into engagement with contact member 1A, a circuit is established for energizing operating coil CR. The latter circuit being completed from the current conductor D, through the current collector to contact member 1A, wire 29, operating coil CR, wire 30, wire 31, resistance unit RC, wire 32, wire 7, solenoid SN, wire 19, wire 20, to the ground G. It must be further understood that the current flowing in the latter circuit is not sufficient to energize solenoid SN. Instant to the energization of operating coil CR, armature C1 disengages back contact 25 and engages front contact 26, thereby completing a circuit for conducting energization current to solenoid SR. The latter circuit being completed from the trolley conductor D, through wire D1, armature B1, front contact 17, wire 28, low resistance holding coil CH, wire 27, contact 26, armature C1, wire 5, armature S1, front contact 6, wire 19, solenoid SR, wire 18, wire 20 to ground G.

Incident to the current collector disengaging contact member 1, operating coil SS became deenergized. However, armature S1 did not disengage front contact 6, since the engagement of the current collector with contact member 1A and the resultant operation of armature C1 operated the mechanical latch LA, and mechanically locked armature S1 in its operated position. It must be noted that the holding coil CH is placed in series with the circuit conducting energization current to the solenoids SN or SR. This feature provides for the retaining of armature C1 in engagement with its front contact 26 as long as energization current flows to either of the solenoids SN or SR, even though the current collector disengages contact member IA.

When the armature CI disengaged its back contact 25, the circuit including the operating coil BR was opened, resulting in the de-energization of operating coil BR. The de-energization of the operating coil BR did not result in armature BI instantly disengaging its front contact 17, since the armature is provided with a retarded release feature previously described. Therefore, after a predetermined time, the armature BI will disengage contact 17, thereby discontinuing the flow of energization current to solenoid SR. Should the current collector continue to engage contact member IA, after armature BI of relay B disengages its front contact 17, armature SI of relay S will be mechanically held in engagement with its front contact 6, and the operating coil BR of relay B will be retained de-energized, since the circuit of operating coil BR will be retained open by the disengagement of armature CI and back contact 25. As soon as the current collector disengages contact IA, and armature BI disengages its front contact 17, the circuit of operating coil BR will be re-established thereby restoring the relays to normal.

Should the current collector, in initially engaging contact member I, engage the contact member for a comparatively short period, the armature SI will not dis-engage its back contact 11. Therefore, as soon as the current collector engages contact member IA, armature CI will operate to mechanically retain armature SI in engagement with its back contact 11, and close the circuit for conducting energization current to solenoid SN. Since the subsequent operation of relays B and C is similar to that outlined above, it is believed that a further description of the circuit and its operation is unnecessary.

In the event the current collector travels in the reverse direction, and initially engages contact member IA, relay C will operate in advance of relay S. Therefore, armature CI will mechanically lock armature SI in engagement with its back contact 11, and close the circuit for conducting energization current to solenoid SN in the same manner previously described when the contact member I was engaged for a comparatively short period. If the current collector disengages contact member IA and engages contact member I before the armature BI disengages contact 17, the mechanical latch LA will prevent an operation of the armature SI. If the current collector disengages contact member IA and engages contact member I after the armature BI disengages contact 17, the armature SI will be rendered operative as soon as armature CI disengages contact 26. However, neither of the solenoids SN or SR will be further operated, since the current collector has passed out of engagement with the operating contact member IA.

Figure 2:
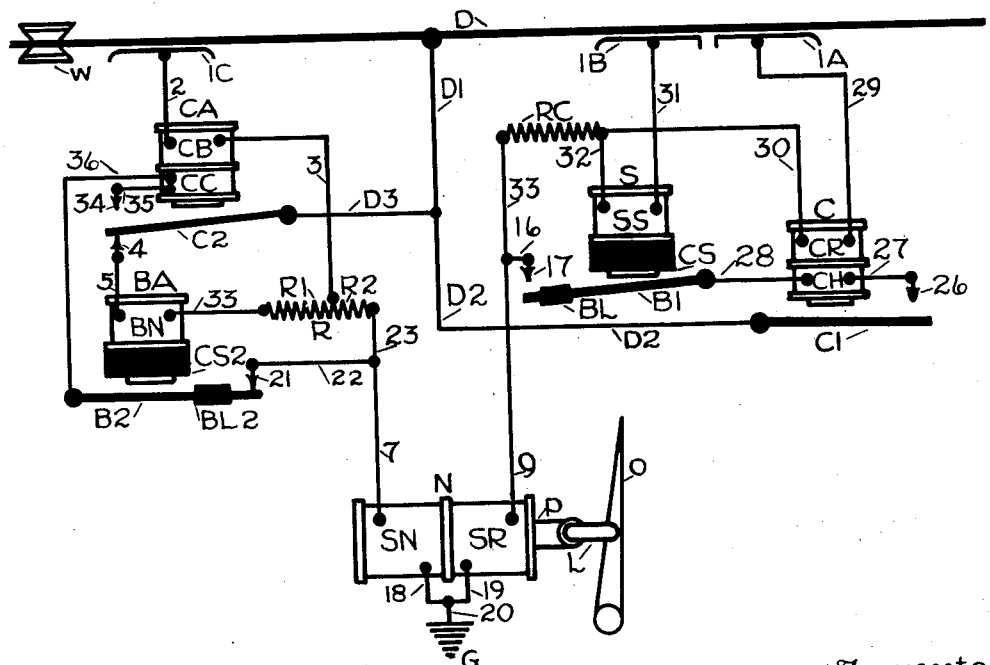
Fig. 2 is a modification of Fig. 1 in which only a part of the mechanism controlling the switch point is selectively controlled, while the other part is operated regardless of the speed of the vehicle.

The control shown in Fig. 2, illustrates an embodiment of my invention for the selective control of a single solenoid. It will be apparent that a current collector first engaging contact member IB, and then successively engaging contact member IA, may select the energization of solenoid SR, dependent upon the relative amount of time the current collector engages contact member IB. That is, if the current collector engages the contact member IB for a comparatively long period, the solenoid SR will be energized, when the current collector subsequently engages contact member IA. On the other hand, the solenoid SR will not be energized if the current collector engages the contact member IB for a comparatively short period. It will also be apparent that the current collector first engaging contact member IA, and then successively engaging contact member IB, will not energize solenoid SR due to the fact that relay C is a quick acting relay, and will accordingly release before the slow acting relay S can be operated.

With further reference to Fig. 2, it will be noted that a circuit for energizing operating coil CB is completed when the current collector engages contact member IC. The latter circuit being completed from the trolley conductor D, through the current collector to contact member IC, through wire 2, operating coil CB, wire 3, resistance unit R2, wire 23, wire 7, solenoid SN, wire 18, wire 20 to ground G. It is to be understood that the current flowing in the latter circuit is not sufficient to energize solenoid SN.

It is to be noted that the operating coil BN, of the retarded release relay BA, is normally energized; the circuit, therefore, being completed from the current conductor D, through wide DI, wire D3, armature C2, contact 4, wire 5, operating coil BN, wire 33, resistance unit RI, resistance unit R2, wire 23, wire 7, solenoid SN, wire 18, wire 20 to ground G. It is to be further understood that the current flowing in this circuit is likewise not sufficient to energize solenoid SN.

Incident to the engagement of armature C2 and front contact 34, a circuit is established for conducting energization current to solenoid SN. The latter circuit being completed from the current conductor D, through wire DI, wire D3, armature C2, front contact 34, wire 35, low resistance holding coil CC, wire 36, armature B2, contact 21, wire 22, wire 7, solenoid SN, wire 18, wire 20 to ground G.

Incident to the disengagement of armature C2 and back contact 4, the circuit of operating coil BN is opened, resulting in the de-energization of operating coil BN.

The de-energization of operating coil BN will not result in armature B2 instantly disengaging contact 21, since the armature B2 is provided with a means for retarding its release, symbolically represented by CS2. Obviously this means may be of the same type previously described in connection with relay B of Fig. 1. It is to be noted that the low resistance holding coil CC is included in the circuit conducting energization current to solenoid SN. This feature provides for the retaining of armature C2 in engagement with its front contact 34 as long as energization current flows to the solenoid SN, even though the current collector disengages contact member IC.

A predetermined time after operating coil BN is de-energized, armature B2 disengages contact 21, and thereby discontinues the flow of energization current to solenoid SN. If the current collector remains in contact engagement with contact member IC after armature B2 disengages contact 21, armature C2 will not release because of the energization of coil CB. Accordingly, operating coil BN will be held de-energized through the disengagement of armature C2 and contact 4. As soon, however, as the current collector disengages contact member IC, armature C2 will engage contact 4 and re-establish the circuit of operating coil BN, thereby restoring the relays, controlling solenoid SN, to normal.

The vehicle, in moving from left to right, subsequently brings current collector W into engagement with contact member 1B, and thereby completes a circuit for energizing solenoid SS. The latter circuit being completed from the trolley conductor D, through the current collector to contact member 1B, through wire 31, operating coil SS, wire 32, resistance unit RC, wire 33, wire 9, solenoid SR, wire 19, wire 20 to ground G. It is to be further understood that the current flowing in the latter circuit is not sufficient to energize solenoid SR.

Upon energization of operating coils SS, armature B1 does not instantly engage contact 17, since armature B1 is provided with a retarded pickup device, symbolically represented by CS. Obviously, this device may be of the same type described for relay S in Fig. 1.

Should the current collector remain in engagement with contact member 1B for a comparatively long period, the operating coil SS will be energized for a time sufficient to bring armature B1 into engagement with contact 17.

As soon as the current collector advances and engages contact member 1A, a circuit is completed for energizing operating coil CR. The latter circuit being completed from the current conductor D, through the current collector W to contact member 1A, through wire 29, operating coil CR, wire 30, resistance unit RC, wire 33, wire 9, solenoid SR, wire 19, wire 20 to ground G. It is to be also understood that the current flowing in the circuit just described, is not sufficient to energize solenoid SR.

The energization of operating coil CR raises armature C1 into engagement with contact 26, thereby completing a circuit for conducting energization current to solenoid SR. The latter circuit being completed from the current conductor D, through wire D1, wire D2, armature C1, contact 26, wire 27, low resistance holding coil CH, wire 28, armature B1, contact 17, wire 16, wire 9, solenoid SR, wire 19, wire 20 to ground G. It is to be noted that the low resistance holding coil CH is connected in series with the circuit conducting energization current to solenoid SR. This feature provides for the retaining of armature C1 in engagement with contact 26 as long as energization current flows to solenoid SR, even though the current collector W disengages contact member 1A.

The current collector W in disengaging contact member 1B, opened the circuit of operating coil SS, and accordingly de-energized the operating coil SS. The de-energization of operating coil SS did not result in armature B1 instantly disengaging contact 17, since relay S is provided with means to retard the release of armature B1 in addition to the device previously mentioned for retarding its pickup. Therefore, a predetermined time after the de-energization of operating coil SS, armature B1 disengages contact 17, thereby discontinuing the flow of energization current to solenoid SR. Thus it is apparent that the operation of armature B1 to discontinue the flow of energization current to solenoid SR, is independent of the length of time the current collector engages contact member 1A.

Should the vehicle move from right to left, the contact member 1A will be first engaged. Therefore, the operation of relay C will not direct energization current to solenoid SR, since armature B1 is not in engagement with contact 17. Similarly, when the current collector advances and engages contact member 1B, the armature C1 will instantly release, and, even though the time of engagement of current collector W and contact member 1B is sufficient to bring armature B1 into engagement with contact 17, energization current will not be directed to solenoid SR, since the circuit is opened by the dis-engagement of armature C1 and contact 26.

The foregoing description, made in conjunction with the accompanying drawing, illustrated the features of my invention applied to the selective control of an electrically operated track switch. However, it is to be understood that modifications of my invention, for the selective control of signals, are numerous, and have not been included, since it is believed that it will be apparent to those skilled in the art, the variations in circuit arrangements necessary to meet numerous signal applications. Therefore, my invention is not to be restricted to the specific arrangements shown and described, and claims commensurate with the scope of my invention must accordingly embrace the selective operation of signals as well as switches.

Having thus described my invention, I claim:

1. A selectively operated relay system comprising, a trolley contactor having a pair of contact members to be successively engaged by a current collector; a selector switch; a normally de-energized operating coil for the said switch; means, controlled by the engagement of said current collector with one of said contact members, to energize the said operating coil; means, providing operation of the said switch, only when the said operating coil is continuously energized for a predetermined time, and not otherwise; and means, controlled by the engagement of the said current collector with the other of said contact members, to retain the said switch operated as long as the said current collector engages the said other contact member, only when the said operating coil is continuously energized for said predetermined time, and the said current collector successively engages the said other contact member, and not otherwise.

2. A selectively operated relay system comprising, a trolley contactor having a pair of contact members to be successively engaged by a current collector; a source of power; a selector switch; a normally de-energized operating coil for the said selector switch; means, controlled by the engagement of said current collector with one of said contact members, to energize the said operating coil; means providing operation of the said switch, only when the said coil is continuously energized for a predetermined time, and not otherwise; and means, controlled by the engagement of the said current collector with the other of said contact members, to connect the said selector switch to the said source of power.

3. In a selectively operated control system comprising, an electrically operated mechanism adapted to be operated to one position while a vehicle is passing over a particular portion of its path of travel; a vehicle-actuated contactor having a pair of normally open contacts to be successively closed by a vehicle; a time-delay relay for determining selectively the operation of the said mechanism; means, responsive to the closing of one of said contacts, operating the said time-delay relay, when the said one contact is closed for a predetermined time; and means responsive to the closing of the other of said contacts, for cooperating with the said time-delay relay to operate the said mechanism, only when the said time-delay relay is operated, and not otherwise.

4. In a selectively operated relay system comprising, a pair of normally open contacts to be successively closed by a vehicle, while the said vehicle is passing over a particular portion of its path of travel; a source of power; an electrically operated mechanism adapted to be selectively operated or not operated; an operating circuit for the said mechanism; a normally open selector switch in the said operating circuit, and a normally open control switch in the said operating circuit; means, responsive to the closing of one of said contacts, for selectively closing or not closing the said selector switch, dependent upon whether the said one contact is maintained continuously closed for a predetermined time, or not; and means, responsive to the closing of the other of said contacts, for closing the said control switch, to operate the said mechanism, when the said selector switch is closed.

5. A selectively operated relay system comprising, a pair of normally open contacts to be successively closed by a vehicle, while the said vehicle is passing over a particular portion of its path of travel; a mechanism adapted to be selectively operated or not operated; a selector switch; means, responsive to the closing of one of said contacts, providing operation of the said switch, only when the said one contact is continuously closed for a predetermined time; and means, responsive to the closing of the other of said contacts, cooperating with the said switch to operate the said mechanism, only when the said switch is operated, and the said current collector successively engages first the said one contact and then the said other contact, and not otherwise.

6. A track switch operating system comprising, a trolley contactor having a pair of contact members to be successively engaged by a current collector; a track switch; mechanism for operating the said track switch to one of its operable positions; a time-delay relay operable in response to the engagement of the current collector with one of said contact members, for selecting operation of the said mechanism, when the said current collector engages the said one contact member for a predetermined time and not otherwise; a control relay operable in response to the engagement of the said collector with the other of said contact members, for cooperating with the said time-delay relay to operate the said mechanism, when the said time-delay relay is operated; and means for operating the said track switch to the other of its operable positions.

7. In a track switch operating system comprising, a source of power; a trolley contactor having a pair of contact members to be successively engaged by a current collector; a track switch; electrically operated mechanism for operating the said track switch; an operating circuit for the said mechanism; a pair of normally open switches electrically connected in series and included in the said circuit, for maintaining the said circuit normally de-energized; means, responsive to the engagement of the current collector with one of said contact members, for closing one of said switches; means responsive to the successive engagement of the current collector with the other of said contact members, for closing the other of said switches, thereby energizing the said circuit with each of the said switches in closed condition; and means providing a closing of the said one switch, only when the said collector engages the said one contact member for a predetermined time.

FRANK H. RICHTERKESSING.